United States Patent Office 2,743,173
Patented Apr. 24, 1956

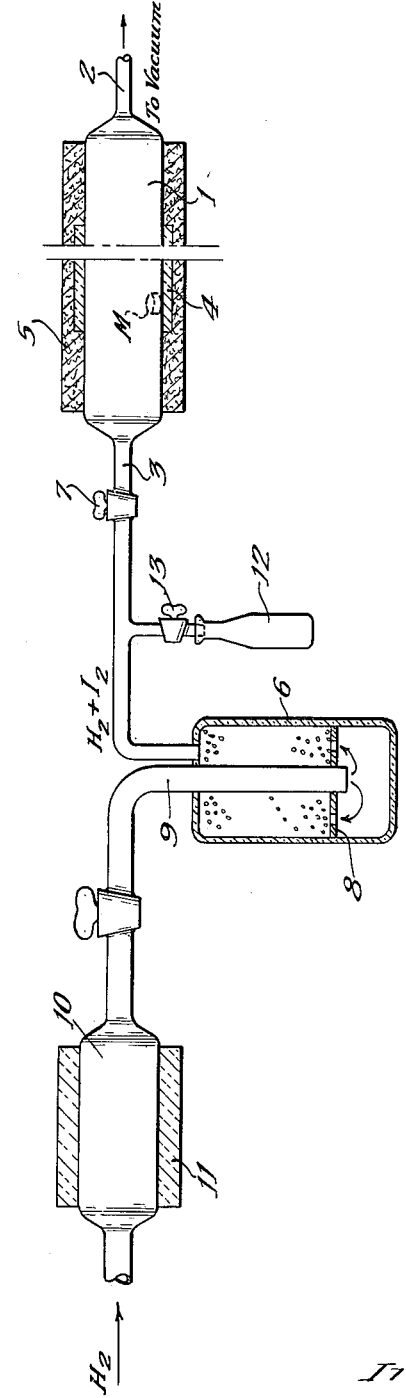

2,743,173
METHOD OF PREPARING METAL AND APPARATUS THEREFOR

Gerhard Derge, Aspinwall, Pa., and Gilbert P. Monet, Oak Ridge, Tenn., assignors to the United States of America as represented by the United States Atomic Energy Commission Application May 28, 1945, Serial No. 596,223

11 Claims. (Cl. 75—84.1)

This invention relates to a method and apparatus for preparing metals of extremely high purity by the thermal decomposition of volatile compounds of the metal.

One of the principal objects of the present invention is to provide a method and apparatus by which metal may be produced in large amounts from an impure source of the metal by the formation and decomposition of the volatile compounds of the particular metal.

A more specific object of the invention is to produce spectrographically pure uranium metal in massive form from a source of impure uranium metal.

Another object is to decompose a volatile compound of a metal by passing it through a reaction chamber of which the walls are gradiently heated to provide, in the direction of flow of the compound therethrough, first a vaporization zone for vaporizing the compound and a decomposition zone in which the metal of the compound is precipitated on the walls of the chamber in massive form by decomposition of the compound.

Other objects and advantages will become apparent from the following description in which, for purposes of illustration, the application of the method and apparatus to the production of uranium metal of high purity is disclosed, reference being made to the accompanying drawing in which the figure is a diagrammatic side elevation, partly in section, of an apparatus suitable for practising the method illustratively disclosed.

Referring to the drawing, the apparatus may comprise a reaction chamber 1 which preferably is in the form of a tube having a refractory lining, the composition of which is hereinafter more fully described. The chamber 1 is connected at one end with a tube 2 which leads to a suitable mercury diffusion pump (not shown) and at its other end to an inlet tube 3. The chamber 1 is heated along a portion of its length by a suitable furnace, such as a gradient electric furnace 4, of which the most highly heated portion preferably is located about the longitudinal midportion of the chamber 1, and which extends a selected length of the chamber 1. The furnace 4 preferably lies in surrounding relation to the chamber 1 and both the furnace and chamber are packed in suitable insulation as indicated at 5.

For supplying a suitable sweeping gas and halogen into the chamber 1, the inlet tube 3 is connected to a receptacle 6, a stopcock 7 being interposed between the chamber 1 and the receptacle 6. The receptacle 6 is adapted to contain a suitable source of the halogen for providing the halogen vapor required for forming a volatile halide of the metal to be purified. In the form illustrated, the receptacle 6 is arranged with a perforated partition wall 8 adjacent but spaced from the bottom for supporting a quantity of glass beads covered with iodine. An inlet tube 9 is arranged to discharge in the bottom of the receptacle 6 below the wall 8.

The inlet end of the inlet tube 9 is connected to a suitable source of sweeping gas such as hydrogen, a palladium thimble 10 being interposed between the inlet of the tube 9 and the source of hydrogen. A furnace 11 is provided for controlling the temperature of the palladium thimble to effect purification and control of the flow of hydrogen.

In addition to the receptacle 6, a receptacle 12 under the control of a stopcock 13 may be connected to the inlet tube 3 and detachable therefrom. The receptacle 12 is arranged to contain an additional source of iodine so as to make possible a greater variation in the ratio of iodine vapor to hydrogen.

In operation, the chamber 1 is heated so as to provide, in the direction of flow, first a vaporizing zone and then a decomposition zone. Two separate furnaces may be used instead of the gradient furnace 4, if desired, to heat the two zones. The major source or mass of the metal to be treated is placed in the vaporization zone of the receptacle 1, as indicated at M.

Assuming for purposes of illustration that highly purified uranium is to be prepared from a mass of impure uranium metal, the mass of impure uranium metal, indicated at M, is disposed in the vaporization zone of the chamber 1. The system is evacuated and cleansed by washing with hydrogen gas and heat is applied to the chamber 1 by the furnace 4 to provide in the vaporization zone of the receptacle 1 a temperature sufficient to form the volatile compound of the metal at the pressure maintained in the chamber. For forming uranium iodide vapor, temperatures up to about 1000° C. have been found satisfactory when the pressure is maintained at a very low level. The furnace 4 raises the temperature of the decomposition zone, which is beyond the metal M in the direction of flow, to a desired degree which may be above the melting point of the pure metal to be precipitated. In the case of uranium, a temperature above 1000° C. and preferably about 1470° or higher is satisfactory when precipitation above the melting point is desired.

During operation a very low pressure is maintained in the chamber 1 and the volatile uranium iodide immediately after formation is decomposed in the decomposition zone of the chamber 1 and the metal precipitates directly an the walls of the chamber 1 as a mass and not as a powder.

As a specific example of uranium preparation, a 50 gram mass of uranium metal was placed in the chamber 1 and heated to between 1000 to 1100° C. Hydrogen at the rate of 5 cubic centimeters per minute and iodine vapor from a source of iodine at 30° C. were introduced together into the chamber 1 and caused to pass in contact with the uranium, the pressure being maintained at about $10^{-3}$ millimeter of mercury. This operation was maintained for a period of 5 hours during which 25 grams of the impure uranium metal were volatilized and 8.29 grams of spectrographically pure uranium metal were deposited in the form of a mass, and not as a powder, on the wall of the chamber 1 about 3 inches from the impure metal mass.

It is believed that the remainder of the volatilized uranium was volatilized as $UI_4$ but immediately decomposed to $UI_3$, a non-volatile uranium iodide. However, there need be no loss from this operation as the $UI_3$ can be recovered and converted into $UI_4$. The reaction which accounts for the operation is as follows:

(1) 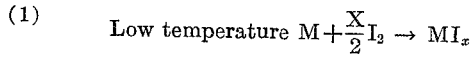
Low temperature $M + \frac{x}{2} I_2 \rightarrow MI_x$ (2) 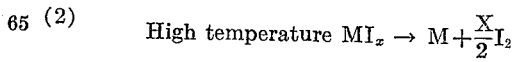
High temperature $MI_x \rightarrow M + \frac{x}{2} I_2$ (3) 
Side reaction $H_2 + I_2 \rightarrow 2HI$ In order to disclose the applicability of the method and apparatus to other metals, certain features of the invention and the controls therefor are to be noted, the first of which is the chemistry of the operation.

The Reaction 1 is the reverse of Reaction 2 but Reaction 2 occurs at a temperature above 1000° C. and preferably around 147° C. The temperature of Reaction 1 must be above the volatilization temperature of the metal iodide at the particular low pressure maintained in the chamber 1. It should be high enough to volatilize the metal iodide as rapidly as the iodide forms on the metal surface. At the same time it must be low enough so that the equilibrium between the metal and the metal iodides favors the production of metal iodide. This temperature is preferably such that the rate of formation of the metal iodide is high and said metal iodide also has an appreciable volatility. Between these extreme temperatures recited there is usually an intermediate temperature which will give a maximum rate of volatile iodide production and this temperature may be determined easily and empirically for each metal.

The temperature of the decomposition zone of the chamber 1 where deposition of metal takes place should be sufficiently high to favor Reaction 2 over Reaction 1.

The rate of iodine flow is a definite factor in the reaction as is also the state of subdivision of the metal, the former being dependent largely on the amount of hydrogen which is passed through the receptacle 8 and the vapor pressure of the iodine. The latter depends largely upon the surface area of the metal to be exposed to the action of the iodine vapor, the production of iodide being generally in a somewhat direct proportional relation to the exposed area of metal, other factors being maintained constant. Metal temperature also has an effect on the rate of iodide production, the production being greater generally as the temperature increases.

The sweeping gas preferably not only provides a sweeping effect in the chamber 1 for the mechanical removal or conveyance of gaseous decomposition products but also a scavenging effect by combining with any excess halogen so as to render it inactive with respect to the metal already deposited and thus prevent a reversal of the reaction. Hydrogen has these functions as it can react with iodine vapor liberated by decomposition to give HI and thus decrease the amount of recombination of metal and iodine. Also it may initiate the reaction of metal and iodine vapor in the vaporization zone of the chamber 1 by forming a metal hydride as an intermediate step in the production of a metal iodide. Lastly hydrogen may simply serve as a scavenger and as a cleansing agent for cleaning the metal surfaces or the surfaces of the chamber 1. It is definitely established that hydrogen, though not absolutely essential for the production of some metal, very greatly increases the yield in the case of uranium iodide. Use of an inert gas or iodine vapor alone are sufficient for some production under the proper operating conditions.

A specific feature of the invention resides in the provision of a proper chamber 1 which will withstand the temperatures required without reacting with the metal and which at the same time can sustain the low operating pressures without leakage or infiltration of outside atmosphere.

In a preferred embodiment of the invention, the chamber 1 is in a form of a tube which may be porcelain or stainless steel or other suitable material which is impervious to the atmosphere at pressures hereinbefore recited, of sufficient thickness and rigidity to maintain its shape under high temperature, and is capable of being effectively sealed into the system under the operating temperatures employed. Porcelain and stainless steel tubes are satisfactory. Since metal such as uranium and other metals are extremely reactive at their respective melting temperatures, it is preferred that the interior wall portions of the tube or chamber 1, where exposed to the molten uranium, be coated with a suitable refractory coating. A coating which has been particularly desirable is calcium beryllate although in some cases alumina, thoria and other coatings may be employed. In the case of low melting point and less reactive metals, heat resistant metals may be used.

For coating the inner wall of the tube with calcium beryllate, it is preferred to use about 4 to 5 parts of beryllia slurry of about 200 mesh mixed with one part of precipitated calcium beryllate as a binder. This material is suitable for coating a porcelain or stainless steel tube. It is best applied to the tube as a very heavy coat which is first air dried, then fired with a gas burner to produce beryllia and calcium whereupon it is baked for about 5 hours at 1400° C.

The calcium beryllate of the preferred preparation itself is prepared from beryllium nitrate by precipitating and redissolving in an excess of potassium hydroxide. The solution is then neutralized with hydrochloric acid until the first signs of a precipitate of beryllium hydroxide appear. An aqueous solution of calcium chloride is then added to the potassium beryllate and a fine white powder is precipitated which is taken to be calcium beryllate. This precipitate is then filtered, suspended in water, filtered, and washed to remove the excess chloride and is then added to the slurry of beryllia at approximately 1 part of the calcium beryllate to 4 or 5 parts of the beryllia.

In addition, suitable coating can be formed of $ThO_2$, $MgO$, $BeO$, $ZrO_2$ and $Al_2O_3$.

While the present invention for purposes of illustration has been described as applied to the production of spectrographically pure uranium metal by the decomposition of a volatile iodide of uranium against a heated calcium beryllate surface it is apparent that it may be applied to plutonium, neptunium, and to many other metals, without departing from the invention.

Having thus described the invention, what is claimed is:

1. A reactance chamber comprising a rigid self supporting impervious shell having an inner wall portion of calcium beryllate.

2. A reactance chamber comprising a rigid self supporting impervious shell of refractory material lined interiorly with calcium beryllate.

3. A reactance chamber comprising a rigid self supporting impervious shell of refractory material lined interiorly with a different material comprising calcium beryllate.

4. A reactance chamber comprising a rigid, impervious refractory tube and an inner lining of calcium beryllate intimately bonded thereto.

5. A reactance chamber comprising a stainless steel body and an inner lining of calcium beryllate intimately bonded thereto.

6. Apparatus for obtaining metal having an atomic number of at least 90, of high purity and in massive form comprising a chamber lined interiorly with a refractory material comprising calcium beryllate, means for heating certain zones of said lining so as to effect within said apparatus a gradient temperature zone ranging from a lower temperature zone below the melting point of the metal being obtained to a higher temperature zone above the melting point of such metal, and means for producing in the lower temperature zone of said gradient temperature zone a volatile thermally decomposable iodide of the metal to be obtained and heating means for decomposing said metal iodide vapor to massive metal on the lining in said higher temperature zone.

7. The method of preparing substantially pure massive uranium metal comprising continuously passing a mixture comprising gaseous hydrogen and iodine in the vapor state at a pressure of about $10^{-3}$ mm. of mercury in contact with a mass of uranium metal containing impurities normally associated therewith, said impure metal being in contact with a portion of a refractory material comprising calcium beryllate while heating said portion to a temperature sufficient to react with said iodine-hydrogen mixture to form a volatile iodide of uranium from said impure uranium and to volatilize said uranium iodide as rapidly as formed from said mass, contacting said uranium iodide vapor immediately as formed with another portion of the refractory material comprising calcium beryllate heated to a temperature above the melting point for pure uranium metal whereby said uranium iodide vapor is decomposed and pure uranium metal in a massive form is formed.

8. The process of claim 7 wherein the temperature of the portions of refractory material ranges gradiently in the direction of flow of the reactants from at least 1000° C. to about 1500° C.

9. A reactance chamber comprising a rigid self-supporting impervious shell having an inner wall consisting essentially of:

Calcium beryllate _____ 1 part.
Beryllia _____ 4 to 5 parts.

10. Apparatus for obtaining substantially pure metal in massive form, said metal having an atomic number of at least 90, comprising a chamber lined interiorly with a refractory material comprising calcium beryllate, means for gradiently heating said lining material from a temperature zone below to a temperature zone above the melting point of said metal and means for maintaining subatmospheric pressures throughout said apparatus.

11. Apparatus for obtaining substantially pure uranium metal in massive form comprising a chamber lined interiorly with a refractory material comprising calcium beryllate, means for maintaining said lining material at a gradient temperature such that said gradient temperature is progressively increased from 1000° C. to about 1500° C. and means for maintaining a pressure of about $10^{-3}$ mm. of mercury throughout said chamber.

References Cited in the file of this patent

UNITED STATES PATENTS

| | | |
|---|---|---|
| 569,104 | Kendall | Oct. 6, 1896 |
| 1,671,213 | Van Arkel et al. | May 29, 1928 |
| 1,829,756 | Noddack et al. | Nov. 3, 1931 |
| 2,173,258 | Lederer | Sept. 19, 1939 |
| 2,246,386 | Schneider | June 17, 1941 |
| 2,336,366 | Mudge | Dec. 7, 1943 |

OTHER REFERENCES

Mellor: Inorganic and Theoretical Chemistry, vol. 12 (1932), published by Longmans, Green & Co., London, p. 93.